US010351687B2

(12) United States Patent
Diendorf et al.

(10) Patent No.: US 10,351,687 B2
(45) Date of Patent: Jul. 16, 2019

(54) COMPOSITION SUITABLE FOR PRODUCTION OF RIGID POLYURETHANE OR POLYISOCYANURATE FOAMS (71) Applicant: EVONIK DEGUSSA GMBH, Essen (DE)

(72) Inventors: Jorg Diendorf, Essen (DE); Raymond M. Geiling, III, Richmond, VA (US); Christian Eilbracht, Herne (DE); Michael Ferenz, Essen (DE)

(73) Assignee: Evonik Degussa GmbH, Essen (DE)

( * ) Notice: Subject to any disclaimer, the term of this patent is extended or adjusted under 35 U.S.C. 154(b) by 52 days.

(21) Appl. No.: 15/107,732

(22) PCT Filed: Dec. 17, 2014

(86) PCT No.: PCT/EP2014/078183
§ 371 (c)(1),
(2) Date: Jun. 23, 2016

(87) PCT Pub. No.: WO2015/101497
PCT Pub. Date: Jul. 9, 2015

(65) Prior Publication Data
US 2016/0319094 A1 Nov. 3, 2016

Related U.S. Application Data (60) Provisional application No. 61/921,921, filed on Dec. 30, 2013.

(51) Int. Cl.
| C08J 9/00 | (2006.01) |
| C08J 9/02 | (2006.01) |
| C08J 9/14 | (2006.01) |
| C08G 18/61 | (2006.01) |
| C08G 18/08 | (2006.01) |
| C08G 18/40 | (2006.01) |
| C08G 18/76 | (2006.01) |
| C08G 77/46 | (2006.01) |
| C08G 101/00 | (2006.01) |

(52) U.S. Cl.
CPC ............ *C08J 9/0042* (2013.01); *C08G 18/14* (2013.01); *C08G 18/4018* (2013.01); *C08G 18/61* (2013.01); *C08G 18/7671* (2013.01); *C08J 9/0061* (2013.01); *C08J 9/02* (2013.01); *C08J 9/146* (2013.01); *C08G 77/46* (2013.01); *C08G 2101/0025* (2013.01); *C08J 2201/022* (2013.01); *C08J 2201/03* (2013.01); *C08J 2203/142* (2013.01); *C08J 2205/10* (2013.01); *C08J 2375/06* (2013.01); *C08J 2375/08* (2013.01); *C08J 2483/12* (2013.01)

(58) Field of Classification Search
CPC .... C08G 18/14; C08G 18/4018; C08G 18/61; C08G 18/7671; C08G 77/46; C08G 2101/0025; C08J 9/0042; C08J 9/0061; C08J 9/02; C08J 9/146; C08J 2201/022; C08J 2201/03; C08J 2203/142; C08J 2205/10; C08J 2375/06; C08J 2375/08; C08J 2483/12
See application file for complete search history.

(56) References Cited

U.S. PATENT DOCUMENTS

| 4,147,847 | A | 4/1979 | Schweiger | |
| 4,855,379 | A | 8/1989 | Budnik et al. | |
| 6,552,091 | B1 | 4/2003 | Boinowitz et al. | |
| 7,157,541 | B2 | 1/2007 | Knott et al. | |
| 7,196,153 | B2 | 3/2007 | Burkhart et al. | |
| 7,312,364 | B2 | 12/2007 | Cramers et al. | |
| 7,612,158 | B2 | 11/2009 | Burkhart et al. | |
| 8,957,121 | B2 | 2/2015 | Schiller et al. | |
| 2008/0125503 | A1* | 5/2008 | Henning | C08G 18/289 521/106 |
| 2012/0153210 | A1* | 6/2012 | Glos | C08G 18/48 252/62 |
| 2012/0157558 | A1* | 6/2012 | Schiller | C08G 18/61 521/137 |

FOREIGN PATENT DOCUMENTS

| CN | 102604107 B | 7/2012 |
| DE | 19940797 A1 | 3/2001 |
| DE | 102005001076 A1 | 7/2006 |
| EP | 0148576 A1 | 7/1985 |

(Continued)

OTHER PUBLICATIONS

German language International Search Report dated Mar. 11, 2015 in PCT/EP2014/078183 (5 pages).

(Continued)

Primary Examiner — John M Cooney
(74) Attorney, Agent, or Firm — Nexsen Pruet, PLLC; Philip P. McCann (57) ABSTRACT The present invention relates to a composition suitable for production of rigid polyurethane or polyisocyanurate foams, said composition comprising at least one isocyanate component, at least one polyol component, at least one foam stabilizer, at least one urethane and/or isocyanurate catalyst, optionally water and/or blowing agent, and optionally at least one flame retardant and/or further additives, which comprises at least two different varieties 1 and 2 of polyether siloxanes as foam stabilizers, and to the use of this composition for production of foamed polyurethane or polyisocyanurate materials, preferably rigid foams.

16 Claims, 2 Drawing Sheets

(56) References Cited

FOREIGN PATENT DOCUMENTS

| | | |
|---|---|---|
| EP | 0493836 A1 | 7/1992 |
| EP | 0499200 A2 | 8/1992 |
| EP | 0533202 A1 | 3/1993 |
| EP | 0570174 B1 | 2/1996 |
| EP | 0877045 B1 | 1/2002 |
| EP | 1360223 A2 | 11/2003 |
| EP | 1439200 A1 | 7/2004 |
| EP | 1520870 A1 | 4/2005 |
| EP | 1544235 A1 | 6/2005 |
| EP | 2465892 A1 | 6/2012 |
| WO | 02053625 A2 | 7/2002 |

OTHER PUBLICATIONS

German language Written Opinion dated Mar. 11, 2015 in PCT/EP2014/078183 (6 pages).
International Search Report dated Mar. 11, 2015 in PCT/EP2014/078183 (3 pages).
Klostermann et al., U.S. Appl. No. 15/103,015, filed Jun. 9, 2016.
Klotzbach et al., U.S. Appl. No. 14/906,365, filed Jan. 20, 2016.

* cited by examiner

COMPOSITION SUITABLE FOR PRODUCTION OF RIGID POLYURETHANE OR POLYISOCYANURATE FOAMS

This application is a national stage application under 35 U.S.C. § 371 of International Application No. PCT/EP2014/078183 filed 17 Dec. 2014, which claims priority to U.S. Provisional Application No. 61/921,921 filed 30 Dec. 2013, the disclosures of which are expressly incorporated herein by reference.

FIELD

The present invention relates to a composition suitable for production of rigid polyurethane or polyisocyanurate foams, said composition comprising at least one isocyanate component, at least one isocyanate-reactive component, which is preferably a polyol component, at least one foam stabilizer, at least one urethane and/or isocyanurate catalyst, optionally water and/or blowing agent, and optionally at least one flame retardant and/or further additives, which comprises at least two different varieties 1 and 2 of polyether siloxanes as foam stabilizers, and to the use of this composition for production of foamed polyurethane or polyisocyanurate materials, preferably rigid foams.

BACKGROUND

Rigid polyurethane and polyisocyanurate foams are produced using cell-stabilizing additives to ensure a fine-celled, uniform and low-defect foam structure and hence to exert an essentially positive influence on the performance characteristics, particularly the thermal insulation performance, of the rigid foam. Surfactants based on polyether-modified siloxanes are particularly effective and therefore represent the preferred type of foam stabilizer. Various publications already describe such foam stabilizers for rigid foam applications.

EP 0 570 174 B1 describes a polyether siloxane of the structure $(CH_3)_3SiO[SiO(CH_3)_2]_x[SiO(CH_3)R]_ySi(CH_3)_3$, the R substituent of which consist of a polyethylene oxide linked to the siloxane through an SiC bond and end-capped at the other end of the chain by a $C_1$-$C_6$ acyl group. This foam stabilizer is suitable for producing rigid polyurethane foams using organic blowing agents, particularly chlorofluorocarbons such as CFC-11.

The next generation of chlorofluorocarbon blowing agents are hydrochlorofluorocarbons such as HCFC-123 for example. When these blowing agents are used for rigid polyurethane foam production, it is polyether siloxanes of the structural type $(CH_3)_3SiO[SiO(CH_3)_2]_x[SiO(CH_3)R]_ySi(CH_3)_3$ which are suitable according to EP 0 533 202 A1. The R substituent in this case consist of SiC-bonded polyalkylene oxides which are assembled from propylene oxide and ethylene oxide and can have a hydroxyl, methoxy or acyloxy function at the end of the chain. The minimum proportion of ethylene oxide in the polyether is 25 percent by mass.

EP 0 877 045 B1 describes analogous structures for this production process which differ from the first-named foam stabilizers in that they have a comparatively higher molecular weight and have a combination of two polyether substituents on the siloxane chain.

A more recent development in the production of rigid polyurethane foams is to dispense with halogenated hydrocarbons as blowing agents entirely and to use hydrocarbons such as pentane instead. EP 1 544 235 thus describes the production of rigid polyurethane foams using hydrocarbon blowing agents and polyether siloxanes of the already known structure $(CH_3)_3SiO[SiO(CH_3)_2]_x[SiO(CH_3)R]_ySi(CH_3)_3$ having a minimum chain length for the siloxane of 60 monomer units and different polyether substituents R, the blend average molecular weight of which is in the range from 450 to 1000 g/mol and the ethylene oxide fraction of which is in the range from 70 to 100 mol %.

As mentioned, the use of foam stabilizers serves to improve the performance characteristics of polyurethane foams, for example their insulation performance and their surface characteristics. In addition, however, improved processing characteristics would also be desirable. Apparatus used for applying the reaction mixture by low or high pressure foaming machines may clog up at the discharge nozzle because of a build-up of reaction mixture in the process of reacting, particularly in continuous applications and when used as spray foam. This is particularly likely with highly catalyzed/reactive systems because of their high rate of reaction. This may lead to reduced output or complete clogging of the discharge orifice. This in turn entails idle times and short cleaning and maintenance intervals.

The problem addressed by the present invention was therefore that of providing foam stabilizers enabling the production and processing of polyurethane and/or polyisocyanurate foams without retaining one or more of the disadvantages known from the prior art, e.g. the clogging of discharge orifices in processing apparatus, while preferably not exerting any negative influence on foam properties.

The problem was found to be solved, surprisingly, by compositions comprising two different varieties of polyether siloxanes as described hereinbelow and in the claims.

SUMMARY

The present invention accordingly provides compositions suitable for production of rigid polyurethane or polyisocyanurate foams, said compositions comprising at least one isocyanate component, at least one isocyanate-reactive component, at least one foam stabilizer, at least one urethane and/or isocyanurate catalyst, optionally water and/or blowing agent, and optionally at least one flame retardant and/or further additives, which comprise at least two different varieties 1 and 2 of polyether siloxanes as defined hereinbelow and in the claims as foam stabilizers.

The present invention likewise provides for the use of these compositions for production of foamed polyurethane or polyisocyanurate materials, preferably rigid foams.

The present invention also provides for the use of rigid foams according to the present invention as or for production of insulating boards, insulating media and in the form of metal-faced sandwich panels as engineering element for the construction of buildings, cold stores, refrigeration containers and trucks, and also a refrigeration apparatus comprising a rigid polyurethane or polyisocyanurate foam of the present invention as insulant, and also for the use as insulating and filling material in the form of spray foam directly applied atop the surface to be insulated and/or filled into corresponding cavities.

DETAILED DESCRIPTION

The compositions of the present invention, which comprise a combination of polyether siloxanes, make processing possible by reducing and/or slowing the clogging of the discharge orifice of foam applicators and/or processing machines (e.g. discharge orifices of low and high pressure machines, jetting apparatus, spraying apparatus, nozzles). Applying the compositions of the present invention accordingly makes possible higher machine on-stream times and/or longer cleaning intervals.

The composition of the present invention further exhibits good/improved flowability of the reaction mixture to be foamed, thereby facilitating flow into hollow spaces, gaps, irregularities of the surfaces to be treated and further cavities, and also flow around obstacles.

The compositions of the present invention further have the advantage that, as well as improved flowability, other advantageous performance characteristics of foams are also obtained, for example good surface quality, homogeneous foam distribution and good insulation performance.

Polyurethane or polyisocyanurate foams, in particular rigid foams, obtained from compositions of the present invention or to be more precise by use thereof additionally have the advantage of possessing good cell fineness and hence good insulating properties while at the same time exhibiting little by way of foam defects.

The present invention is described hereinafter by way of example, without any intention of limiting the invention to these illustrative embodiments. When ranges, general formulae or compound classes are specified hereinafter, these shall include not just the corresponding ranges or groups of compounds that are explicitly mentioned but also all sub-ranges and sub-groups of compounds which can be obtained by removing individual values (ranges) or compounds. Wherever documents are cited within the context of the present description, then their contents, in particular as regards the substantive matter to which reference is made, are deemed as belonging in their entirety to the disclosure content of the present invention. Average values indicated in what follows are number averages, unless otherwise stated. Unless otherwise stated, measurements were carried out at 20° C. and atmospheric pressure.

Siloxane compounds are conveniently identifiable using a condensed system of nomenclature known as "MDTQ" nomenclature among those skilled in the art. In this system, the siloxane is described according to the presence of the various siloxane monomer units which construct the silicone. The meanings of individual abbreviations in the present document are more particularly elucidated in the present description.

The compositions of the present invention, which are suitable for production of rigid polyurethane or polyisocyanurate foams, comprising at least one isocyanate component, at least one isocyanate-reactive component, which is preferably a polyol component, at least one foam stabilizer, at least one urethane and/or isocyanurate catalyst i.e. a catalyst which catalysis the urethane and/or the isocyanurate reaction), optionally water and/or optionally blowing agent, and optionally at least one flame retardant and/or optionally further additives, comprise at least two different varieties of polyether siloxanes as foam stabilizers, wherein one polyether siloxane variety, hereinafter polyether siloxane variety 1, conforms to formula (I)

$R^1$=independently alike or different hydrocarbon moieties of 1 to 16 carbon atoms, preferably methyl, ethyl, propyl and phenyl, more preferably methyl,
$R^2$=independently $R^1$, $R^3$ or $R^4$,
$R^3$=independently alike or different polyether moieties, preferably polyether moieties of general formula (II), $$-R^5O[CH_2CH_2O]_g[CH_2CH(CH_3)O]_h[CHR^6CHR^7O]_iR^8 \quad (II)$$

$R^4$=independently alike or different moieties of general formula (IIIa) or (IIIb)

$R^5$=alike or different divalent hydrocarbon moieties of 1 to 16 carbon atoms, which may optionally be interrupted by oxygen atoms, preferably a moiety of general formula (IV)

where j=1 to 8, preferably 3,
$R^6$ and $R^7$=independently alike or different hydrocarbon moieties of 1 to 16, preferably 1 to 12 carbon atoms, which may optionally be interrupted by oxygen atoms, or H, more preferably methyl, ethyl, phenyl or H,
$R^8$=independently alike or different hydrocarbon moieties of 1 to 16 carbon atoms, which may optionally be interrupted by urethane functions, —C(O)NH—, carbonyl functions or —C(O)O—, or H, preferably methyl, —C(O)Me or H,
$R^9$=a divalent organic moiety, preferably of 2 to 20 carbon atoms, which may optionally be interrupted by one or more oxygen functions or functions of the formula —[SiR$^1_2$—O]$_k$—SiR$^1_2$— where k=1 to 10, and optionally possess OH functions, more preferably divalent organic moieties of 1 to 16 carbon atoms which may optionally be interrupted by one or more oxygen functions and optionally possess OH functions, a=2 to 32, preferably 2 to 15, more preferably 2,
b=2 to 247, preferably 3 to 150, more preferably 4 to 80,
c=0.5 to 35, preferably 1 to 22, more preferably 1.5 to 12,
d=0 to 6, preferably 0 to 4, more preferably 0,
e=0 to 15, preferably 0 to 10, more preferably 0,
f=0 to 15, preferably 0 to 10, more preferably 0,
with the proviso N=a+b+c+d+e+f=5 to 250, preferably=5 to 160, more preferably=8 to 80,
g=3 to 40, preferably 3 to 30, more preferably 4 to 25,
h=0 to 20, preferably 0 to 12, more preferably 0 to 10,
i=0 to 10, preferably 0 to 5, more preferably 0,
wherein the polyether siloxanes of polyether siloxane variety 1 are subject to the condition that g+h+i is >3 and that there is at least one $R^3$ moiety whose molar weight comprises at least 80% by mass, preferably at least 90% by mass, of —[$CH_2CH_2O$]— units, and the polyether siloxane variety, hereinafter polyether siloxane variety 2, conforms to formula (I) as defined for polyether siloxane variety 1, with the proviso that in the case of polyether siloxane variety 2 a=2 to 32, preferably 2 to 15, more preferably 2,
b=2 to 297, preferably 3 to 190, more preferably 4 to 110,
c=0.3 to 30, preferably 0.9 to 20, more preferably 1.2 to 10,
d=0 to 6, preferably 0 to 4, more preferably 0.1 to 3,
e=0 to 15, preferably 0 to 10, more preferably 0,
f=0 to 15, preferably 0 to 10, more preferably 0,
with the proviso N=a+b+c+d+e+f=5 to 300, preferably=8 to 200, more preferably=10 to 120,
g=3 to 80, preferably 4 to 60, more preferably 5 to 30,
h=1 to 60, preferably 2 to 40, more preferably 3 to 20, and
i=0 to 10, preferably 0 to 5, more preferably 0, and
polyether siloxanes of polyether siloxane variety 2 are subject to the condition that g+h+i is >3 and there is at least one $R^3$ moiety whose molar weight comprises at most 79.5% by mass, preferably at most 60% by mass, and more preferably at most 50% by mass of —[$CH_2CH_2O$]— units.

The polyether siloxanes of formulae (I) are (co)polymers which, owing to their method of making, are usually polydisperse compounds, so the indices used for their description have to be understood as averages (number averages).

The polyether siloxanes present as polyether siloxanes of polyether siloxane variety 1 are preferably those where above 50 mol %, preferably above 70 mol % and more preferably 100 mol % of the $R^8$ moieties in the $R^3$ moieties present are H.

The polyether siloxanes present in the composition of the present invention as polyether siloxanes of polyether siloxane variety 2 are preferably those where less than 50 mol %, preferably less than 30 mol % and more preferably less than 10 mol % of the $R^8$ moieties in the $R^3$ moieties present are H.

Preference among compositions according to the present invention is given to those where the polyether siloxanes present as polyether siloxanes of polyether siloxane variety 1 are those where above 50 mol %, preferably above 70 mol % and more preferably 100 mol % of the $R^8$ moieties in the $R^3$ moieties present are H and where the polyether siloxanes present as polyether siloxanes of polyether siloxane variety 2 are those where less than 50 mol %, preferably less than 30 mol % and more preferably less than 10 mol % of the $R^8$ moieties in the $R^3$ moieties present are H.

The parameters of polyether siloxanes are determinable by methods known to a person skilled in the art. Nuclear magnetic resonance (NMR spectroscopy) is an example thereof. For information as to details for performing the analysis and the evaluation, reference is made to the publication EP 2465892A1 NMR), the chapter "Silicones in Industrial Applications" in "Inorganic Polymers" from Nova Science Publisher, 2007 (ISBN: 1-60021-656-0) and "Frank Uhlig, Heinrich Chr. Marsmann: $^{29}$Si NMR—Some Practical Aspects" in the catalogue "Silicon compounds: Silanes and Silicones" from Gelest, Inc. ($^{29}$Si NMR).

The polyether siloxanes used/present in the composition of the present invention are in principle obtainable according to the prior art processes for preparing polyether siloxanes. The polyether siloxanes of the present invention are preferably synthesized using a platinum-catalyzed reaction of Si—H-functional siloxanes with terminally unsaturated polyethers. A detailed description is given in EP 1 520 870, which is hereby incorporated herein by reference and forms part of the disclosure of the present invention. EP 0 493 836 describes the preparation of polyether-modified siloxanes used in flexible foams. Further examples relating to the preparation of appropriate siloxanes are described for example in U.S. Pat. No. 4,147,847 and U.S. Pat. No. 4,855,379.

The precursors used in this so-called hydrosilylation reaction are in turn obtainable using established chemical processes: The Si—H-functional siloxanes are obtainable by reaction of SiH-free siloxanes, preferably for example hexamethyldisiloxane and decamethylcyclopentasiloxane, with Si—H-functional siloxanes, preferably linear polymethylhydrosiloxanes, for example HMS-993 from Gelest Inc., and optionally linear α,ω-dihydropolydimethylsiloxanes, for example 1,1,3,3-tetramethyldisiloxane, in an acid-catalysed equilibration reaction. The average structure of the product is determined via the ratio of raw materials used.

The terminally unsaturated polyethers are obtainable by reacting terminally unsaturated starter alcohols, preferably allyl alcohol, with various alkylene oxides, preferably under alkaline catalysis with, for example, alkali metal hydroxides or double metal cyanide (DMC) catalysis. The sequence of the polyethers obtained is controlled during reaction via the metering of the alkylene oxides. Block structures are obtainable by first adding alkylene oxide A onto the starter alcohol and, once complete conversion is reached, metering in the alkylene oxide B for addition onto the intermediate. Random sequences are obtainable by using the alkylene oxides A and B in mixed form. Once the desired sequence and molar mass have been synthesized, the polyethers can optionally be subjected either directly to an aqueous work-up, in which case products having a terminal OH function are obtained, or optionally subjected to a further reaction step for endcapping, for example by reaction with methyl chloride to form a methyl ether end group by a Williamson reaction. For instance, EP 1 360 223 and the documents cited therein describe the preparation of olefinic polyethers with and without derivatization of the OH functionality.

A wide variety of alkylene oxides may be used for preparing the polyether moieties, preference being given to ethylene oxide, propylene oxide, optionally butylene oxide and optionally styrene oxide. The sequence of the various alkylene oxide units is freely chooseable, i.e. it is obtainable either through random incorporation or through an intentional blocked construction. Especially in the case of the OH-functional polyether moieties, it can be advantageous to obtain a diblock construction, in which case a purely ethylene oxide block is produced first and then the final endblock, wherein an alkylene oxide other than ethylene oxide is used in the final step.

The mass fraction which the polyether siloxanes of polyether siloxane varieties 1 and 2 (i.e. the mass fraction due to the sum total of the polyether siloxanes of the two polyether siloxane varieties) account for in the composition of the present invention, based on 100 parts by mass of isocyanate-reactive component, which is preferably a polyol component, (pphp) is preferably in the range from 0.05 to 10 pphp, more preferably in the range from 0.1 to 5 pphp and yet more preferably in the range from 0.1 to 3 pphp.

The mass ratio of polyether siloxanes of polyether siloxane variety 1 to polyether siloxanes of polyether siloxane variety 2 in the composition of the present invention is preferably in the range from 0.01:1 to 1:0.01, more preferably in the range from 0.1:1 to 1:0.1, yet more preferably in the range from 0.2:1 to 1:0.2 and yet still more preferably in the range from 0.5:1 to 1:0.5.

It may be advantageous for the composition of the present invention to include more than 50 wt %, preferably more than 90 wt %, both based on the sum total of polyether siloxanes present in the composition, of polyether siloxanes conforming to formula (I) as defined for polyether siloxane varieties 1 and 2. It is particularly advantageous for the composition of the present invention to contain exclusively polyether siloxanes that are encompassed by the definitions of polyether siloxane varieties 1 or 2.

By way of isocyanate component, the composition according to the invention can include any isocyanate compounds suitable for producing rigid polyurethane or polyisocyanurate foams. Preferably, the composition according to the invention includes one or more organic isocyanates having two or more isocyanate functions, for example 4,4'-diphenylmethane diisocyanate (MDI), toluene diisocyanate (TDI), hexamethylene diisocyanate (HMDI) and isophorone diisocyanate (IPDI). The mixture of MDI and more highly condensed analogues having an average functionality of 2 to 4 which is known as crude MDI ("polymeric MDI") is particularly suitable, as well as each of the various isomers of TDI in pure form or as isomeric mixture.

The isocyanate-reactive component used may be any organic substance having two or more isocyanate-reactive groups, and also preparations thereof. The isocyanate-reactive component used is preferably a polyol component. Preferred polyols are any polyols customarily used for production of polyurethane foams, for example polyether polyols and polyester polyols. Polyether polyols are obtainable by reacting polyfunctional alcohols or amines with alkylene oxides. Polyester polyols are preferably based on esters of polybasic carboxylic acids (which may be either aliphatic, as in the case of adipic acid for example, or aromatic, as in the case of phthalic acid or terephthalic acid, for example) with polyhydric alcohols (usually glycols).

A suitable ratio of isocyanate and polyol, expressed as the index of the formulation, i.e. as stoichiometric ratio of isocyanate groups to isocyanate-reactive groups (e.g. OH groups, NH groups) multiplied by 100, is in the range from 10 to 1000 and preferably in the range from 80 to 350.

By way of urethane and/or isocyanurate catalysts, the composition according to the invention preferably includes one or more catalysts for the reactions of isocyanate-polyol and/or isocyanate-water and/or the di- or trimerization of the isocyanate. Typical examples are the amines triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethylaminoethoxyethanol and bis(dimethylaminoethyl) ether, tin compounds such as dibutyltin dilaurate or tin(II) 2-ethylhexanoate, bismuth compounds such as bismuth 2-ethylhexanoate, zinc compounds and potassium salts such as potassium acetate and potassium 2-ethylhexanoate.

Preferred amounts of catalysts present in the composition of the invention depend on the type of catalyst and are usually in the range from 0.05 to 15 pphp (=parts by mass based on 100 parts by mass of polyol).

Suitable water contents for the purposes of this invention depend on whether or not one or more blowing agents are used in addition to the water. In the case of purely water-blown foams, the values are typically in the range from 1 to 20 pphp, but when other blowing agents are used in addition, the amount of water used typically reduces to the range from 0 to 5 pphp.

When additional blowing agents are present in the composition according to the invention, these can be physical or chemical blowing agents. The composition preferably includes physical blowing agents. Suitable physical blowing agents for the purposes of this invention are gases, for example liquefied $CO_2$, and volatile liquids, for example hydrocarbons of 3 to 5 carbon atoms, preferably cyclo-, iso- and n-pentane, hydrofluorocarbons, preferably HFC 245fa, HFC 134a and HFC 365mfc, hydrochlorofluorocarbons, preferably HCFC 141b, fully or partially halogenated unsaturated hydrocarbons, oxygen-containing compounds such as methyl formate and dimethoxymethane, or hydrochlorocarbons, preferably 1,2-dichloroethane.

In addition to or in lieu of water and any physical blowing agents, other chemical blowing agents which react with isocyanates to evolve gas may also be used, an example being formic acid, which is typically used in amounts of up to 5 pphp in combination with water or instead of water.

By way of flame retardants, the composition according to the invention may include any known flame retardants suitable for producing rigid polyurethane or polyisocyanurate foams. Suitable flame retardants for the purposes of the present invention are preferably liquid organophosphorus compounds such as halogen-free organophosphates, e.g. triethyl phosphate (TEP), halogenated phosphates, e.g. tris (1-chloro-2-propyl) phosphate (TCPP) and tris(2-chloroethyl) phosphate (TCEP), and organic phosphonates, e.g. dimethyl methanephosphonate (DMMP), dimethyl propanephosphonate (DMPP), or solids such as ammonium polyphosphate (APP) and red phosphorus. Furthermore, halogenated compounds, for example halogenated polyols, and solids such as expandable graphite and melamine are suitable as flame retardants.

The compositions of the present invention are obtainable, for example, by combining two or more separate components, where one of the components is the isocyanate-reactive component and one other component is the isocyanate component, in which case the isocyanate-reactive component is used as a mixture comprising all polyether siloxanes of polyether siloxane variety 1.

Preferably, the isocyanate-reactive component is used as a mixture comprising all polyether siloxanes of polyether siloxane varieties 1 and 2.

There is another embodiment where it may be advantageous for the isocyanate-reactive component to be used as a mixture comprising all polyether siloxanes of polyether siloxane variety 1 and for the isocyanate component to likewise be used as a mixture comprising all polyether siloxanes of polyether siloxane variety 2.

The compositions of the present invention are useful for production of foamed polyurethane or polyisocyanurate materials, preferably rigid foams. In particular, the compositions of the present invention are useful for production of molded polyurethane or polyisocyanurate foams having cavities and/or undercuts. The compositions of the present invention are used with particular preference in such production processes where a spray foam apparatus or a mix head is employed.

The process for producing rigid polyurethane or polyisocyanurate foams in the manner of the present invention comprises reacting a composition of the present invention as described above. A comprehensive review of the prior art, of the raw materials used and of processes which can be used is found in Houben-Weyl: "Methoden der organischen Chemie", volume E20, Thieme Verlag, Stuttgart 1987, (3), pages 1561 to 1757, and in "Ullmann's Encyclopedia of Industrial Chemistry", vol. A21, VCH, Weinheim, 4th edition 1992, pages 665 to 715. The composition according to the invention and/or the process according to the invention provide polyurethane or polyisocyanurate foams, in particular rigid polyurethane or polyisocyanurate foams.

A preferred composition, more particularly a rigid polyurethane or polyisocyanurate foam formulation for the purposes of this invention, would produce rigid polyurethane or polyisocyanurate foams having a foam density in the range from 5 to 200 kg/m$^3$ and preferably in the range from 5 to 80 kg/m$^3$, and would have the following composition in principle:

TABLE 1

Typical rigid foam formulation

| Component | Weight fraction |
|---|---|
| Polyol | 100 |
| Catalyst(s) | 0.05 to 15 |
| Combination of hydrophilic polyether siloxanes of formula (I) and hydrophobic polyether siloxanes of formula (I) | 0.1 to 5 |
| Water | 0 to 20 |
| Blowing agent | 0 to 40 |
| Flame retardant | 0 to 50 |
| Isocyanate index: from 80 to 350 | |

Since the composition according to the invention apart from a few exceptions has been divided up into two components prior to being reacted, the components have to be mixed together to be reacted. This can be done by any method known to a person skilled in the art, for example by manual mixing or preferably by means of low or high pressure foaming machines or by means of spray guns. Batch processes can be used, for example in the manufacture of molded foams and panels, or preferably continuous processes can be used, for example in the case of insulation boards and metal-faced sandwich panels (in the so-called double lamination process), in the case of blocks or in the case of spraying processes.

The use (reaction) of compositions according to the present invention provides foamed polyurethane or polyisocyanurate materials, preferably rigid foams, preferably polyurethane or polyisocyanurate foam, in accordance with the present invention. The proportion of polyether siloxanes of polyether siloxane varieties 1 and 2 according to the invention present in bound and/or unbound form in the rigid polyurethane or polyisocyanurate foams according to the invention is preferably in the range from 0.05 to 10 parts by mass, more preferably in the range from 0.1 to 5 parts by mass and even more preferably in the range from 0.1 to 3 parts by mass based on 100 parts by mass of polyol component.

The rigid foams of the present invention are useful, for example, as or for production of insulation slabs, insulating media, filling material, metal composite elements, engineering element, preferably for the construction of buildings, cold stores, refrigeration containers and trucks or refrigeration apparatus. The rigid foam is preferably in the form of spray foam which is applied directly atop the surface to be insulated or filled and/or into corresponding cavities. This provides refrigerating apparatus, for example refrigerators or freezer chests, and insulated components comprising a rigid polyurethane or polyisocyanurate foam of the present invention as insulant.

Some particularly preferred applications will now be described without any intention to restrict the subject matter of the invention to them.

In one preferred embodiment of the present invention the compositions of the present invention are used in the form of spray foam (in situ foam) for insulation of exteriors, walls, roofs and other structures. In situ polyurethane or polyisocyanurate foam is created directly at the site of use. The foaming mixture is generally applied by spraying, preferably with a high pressure machine, by the components being mixed, and thus reacted, under pressure and preferably at elevated temperature in the mix head of the spray gun before they are discharged therefrom. The composition of the present invention is thus formed by mixing the components in the mix head and/or the mixing or spraying nozzle. The reaction mass (composition of the present invention) is preferably sprayed without additional air supply. The machines may be transportable and equipped with feed hoses to ensure adequate mobility. The machine and the hoses are preferably equipped/sheathed with a temperature maintenance device. The spray gun with the integrated mix head allows discretionary interruption of the spraying process. The reaction mixture landing on the surface to be insulated is very quick to foam up as a result of an appropriately adjusted reaction time, so a delay before an insulating layer of foam has formed is sought. Owing to the fast reaction, the mixture does not even run on vertical or overhead surfaces.

Spraying makes possible the production of insulating layers a few centimeters in thickness. If necessary, for example in order to foam out comparatively large cavities, plug gaps or obtain comparatively thick insulating layers, the layers obtained may be overlaid with one or more such layers.

The use of the compositions of the present invention and/or the polyether siloxane combinations of the present invention facilitate application of spray foam by reducing or slowing the clogging of the spray gun and/or its orifice and thus enabling longer and/or more frequent spraying before the exit orifice has to be cleaned. There is also improved flow for the foaming mass into gaps and hollow spaces.

In a further preferred embodiment, the compositions of the present invention and/or the polyether siloxane combinations of the present invention are used in the continuous production of polyurethane- or polyisocyanurate-based metal panels. In this process, the foaming mixture is applied via a traversing mix head to the lower metal layer in a double band laminator at band speeds of not more than 25 m/min. Preferably, the metal surfacing layers here are profiled. In the laminator, the rising mixture then reaches the upper surfacing layer to produce a continuously formed metal panel which is cut into the desired length at the exit end of the laminator.

Here the foaming mixture has to completely cover the often profiled surfacing layers and completely fill the space between the surfacing layers. In most cases, the foaming mixture is metered here from a mix head on which a so-called casting harp can be situated. A casting harp discharges the mixture from a plurality of openings along the band direction. To obtain a uniform distribution of foam across the width of the panel, the mix head is moved traversingly across the width of the panel. The compositions of the present invention have the advantage here of exhibiting/ensuring improved flow of the liquid reaction mixture on the lower metal layer.

In a further preferred embodiment, the compositions of the present invention and/or the polyether siloxane combinations of the present invention are used in the continuous production of polyurethane- or polyisocyanurate-based panels having flexible surfacing layers. In this process, the reaction mixture to be foamed is applied via one or more mix heads to the lower surfacing layer in a double band laminator at band speeds of up to 80 m/min. In the laminator, the rising mixture then reaches the upper surfacing layer to produce a continuously formed panel which is cut into the desired length at the exit end of the laminator. In view of the high possible band speeds, a large amount of the reaction mass to be foamed up has to be discharged from the mix heads per unit time. It may at the same time be necessary to make the reaction times of the reaction mass very short in order that rapid foaming may be possible, i.e. the systems are highly catalysed and/or very reactive. The compositions of the present invention and/or polyether siloxane combinations show advantages here, since they reduce and/or delay any clogging of the discharge orifices of the mix heads. This can lead to longer maintenance and cleaning intervals and fewer shutdowns and/or higher band speeds.

A multiplicity of different surfacing layers can be used here, examples being paper, aluminum, bitumen, plastic, fibrous nonwoven webs, multilayered foils composed of various materials, etc.

Here, owing to the higher band speeds, the foaming mixture has to spread very uniformly within a short time in order that homogeneous foam without densifications and irregular cell size distribution may form. Owing to the high discharge quantities which are required here, rigs can also be used here which have more than one mix head, in which case the foaming mixture can then be discharged onto the laminator in a plurality of strands. This operation is also referred to as "finger lay down". In general, the compositions of the present invention have advantages here in relation to flow in that the flow of the reaction mass is faster and more uniform than on using polyether siloxanes according to the prior art.

The present invention is more particularly elucidated with reference to FIGS. 1 to 3 without being limited thereto.

The examples listed below illustrate the present invention by way of example, without any intention of restricting the invention, the scope of application of which is apparent from the entirety of the description and the claims, to the embodiments specified in the examples.

EXAMPLES

The examples described hereinbelow use the (spray foam) formulations particularized in Table 2 to produce a foam having a density of 32 kg/m$^3$:

TABLE 2

Formulations used in the examples

| | Component | Parts by weight |
|---|---|---|
| Polyol component | Terol 305 Polyol (Huntsman) | 50 parts |
| | Carpol MX 425 Polyol (Carpenter) | 20 parts |
| | TCPP | 15 parts |
| | Dimethylaminoethanol | 3 parts |
| | Bis(2-dimethylaminoethyl)ether | 1 part |
| | HFC-245fa | 7 parts |
| | Water | 2 parts |
| Isocyanate component | MDI Rubinate M (Huntsman) | 100 parts |

Spray foam application utilizes a Graco Reactor E-20 spray foam apparatus and a Graco Fusion AP spray gun with an 01 nozzle. Processing temperature is at 43° C. Processing pressure is about 83 bar for the two components, which leads to a dynamic pressure of about 69 bar during the spraying process.

The following method is used to measure the reduced clogging of the discharge nozzle of the spray foam apparatus in the application of spray foam:

The spray gun is actuated for each time for two seconds, followed by a pause of two seconds. A wooden slab is sprayed from a constant distance of 40 cm, kept constant by a guide device, such that a foam track 18 cm in width and 5 cm in thickness is obtained in one pass. This is continued until the onset of congestion as evidenced by a reduction in the width of the discharged spray (spray width) to 15 cm.

Testing is started with comparative samples by determining the number of spray and pause sequences before congestion becomes evident. The comparative samples each contain a foam stabilizer which is unitary and thus not in accordance with the present invention. This is followed by determining the number of spray-pause sequences in the same way with foam stabilizer combinations which are in accordance with the present invention.

Figure 1:
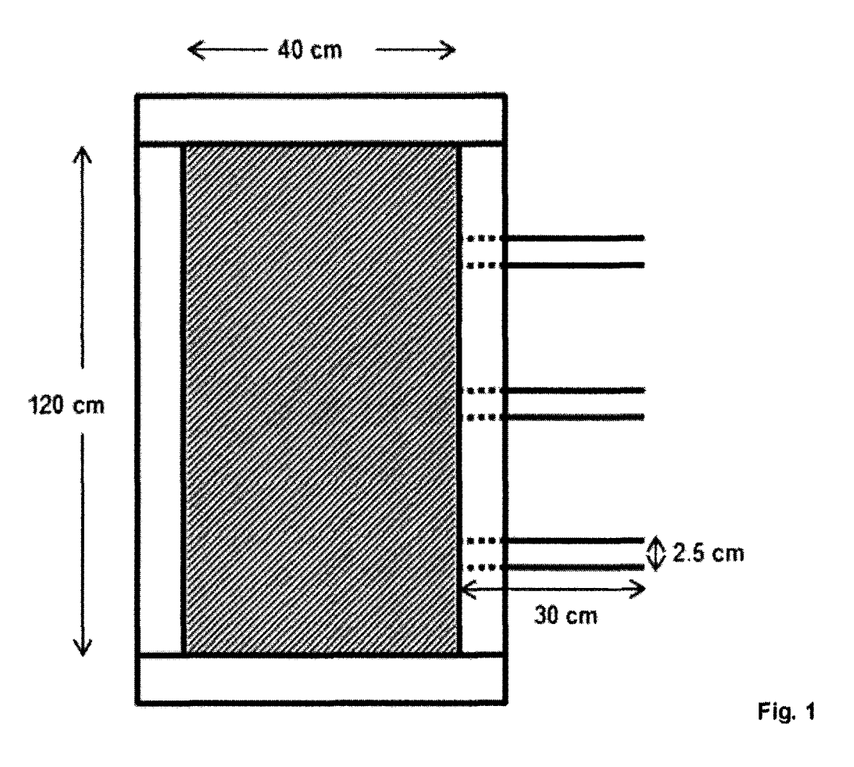
FIG. 1 shows a plan view of the exemplified model of a cavity.
Figure 2:
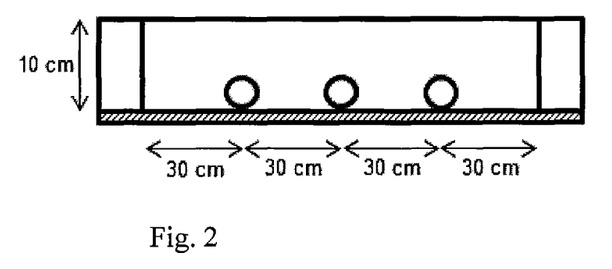
FIG. 2 shows a view of the longitudinal side of the exemplified model of a cavity.
Figure 3:
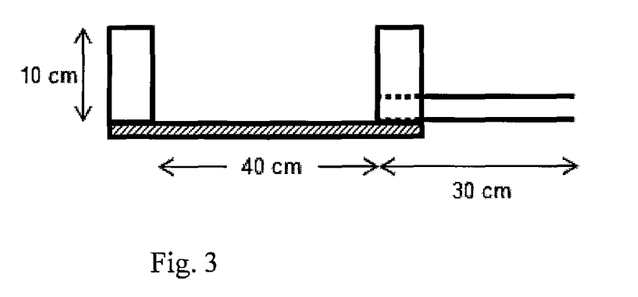
FIG. 3 shows a view of the transverse side without the rear and front walls of the exemplified model of a cavity.

The following method is used to measure the flowability of the foaming mixture: A model of a cavity is constructed from OSB board as bottom and side walls. The cavity has the internal dimensions of 40 cm (width) by 120 cm (length) by 10 cm (height). Three holes are drilled through a longitudinal side at a regular separation from the wall and relative to each other, and three transparent plastics tubes are inserted therein in a close fit. The plastics tubes have an internal diameter of 2.5 cm and a length of 30 cm, the separation from the side walls and relative to each other is 30 cm in each case. The holes and/or tubes are fitted flush with the base of the cavity. These tubes were intended to represent joints within the hollow space to be filled, and the spray foam is intended to flow into them. The amount of spray foam flowing into the tubes is measured by measuring the length of the filled tubes, and permits conclusions to be drawn about the flowability of the foam. FIGS. 1 to 3 illustrate the construction of the model.

The spray foam is introduced using, again, a Graco Reactor E-20 spray foam apparatus and a Graco Fusion AP spray gun with an 01 outlet nozzle. The foam is sprayed into the cavity in a thickness of 5 cm in a single pass such that the cavity is filled up from its bottom surface. The foam quantity penetrated into the tubes is determined by measuring the length of the filled tube. This is done by measuring from the point of inception of the tubes on the outer wall of the structure. The lengths of filling in the three tubes are used to determine the average length of filling in the three tubes.

By way of comparative samples, foams are foamed in the hollow space using a unitary, hence non-inventive, foam stabilizer and the length of the filling in the plastics tubes is measured. The inventive polyether siloxane combinations to be assessed are then used to determine the change in the flowability of the foam in the same way. The observed change in the length of the filled piece of the plastics tube can be used to compute the percentage improvement in flow relative to the base system.

The polyether siloxanes used in the examples are prepared as follows:

The Si—H-functional siloxanes to be used are prepared as in Example 1 of EP 1439200 from the corresponding siloxane raw materials by equilibration (To prepare siloxanes with terminal modification, it is correspondingly necessary to use a polymethylhydrosiloxane with terminal hydrogen functionality as raw material.). Raw material type and quantity is chosen such that the siloxane structure desired in each case is obtained.

The allyl polyethers are prepared similarly to the method described in Example 1 of DE 19940797 although here allyl alcohol is used as starter and correspondingly ethylene oxide and propylene oxide.

The allyl-started polyethers used are etherified (end-capped) by reaction with methyl chloride according to the method described in DE 102005001076.

The hydrosilylation reactions (of the Si—H-functional siloxanes with the allyl polyethers) are carried out as described in Example 1 of EP 1 520 870 with the mixture, as necessary, of divinyltetramethyldisiloxane or 1,7-octadiene in the appropriate amounts.

Example 1: Reduction in Discharge Nozzle Clogging of Spray Foam Apparatus

The following polyether siloxanes were used:

Polyether siloxane A: hydrophilic, of structure $M_2D_{11}D'_3$
where $R^2=R^1=CH_3$; $R^3=-(CH_2)_3-O-[CH_2CH_2O]_{12}H$ Polyether siloxane B: hydrophobic, of the structure $M_2D_{70}D'_{7.5}D''_{0.5}$
where $R^2=R^1=CH_3$; $R^3=-(CH_2)_3-O-[CH_2CH_2O]_{19}[CH_2CH(CH_3)O]_{10}Me$; $R^9=-CH_2-CH_2-[Si(CH_3)_2 O]_1-Si(CH_3)_2CH_2-CH_2-$ A first experimental series of Example 1 has both the hydrophobic polyether siloxane B of the polyether siloxane combination present in the polyol component used as isocyanate reactive component, the hydrophilic polyether siloxane A is likewise present in the polyol component. The results are summarized in Table 2.

TABLE 2

| Ex. | Weight fraction of A in polyol component | Weight fraction of B in polyol component | Number of spray passes before evidence of congestion | |
|---|---|---|---|---|
| 1.1 | 1.0 parts | 0 parts | 10 | Not according to the invention (Standard) |
| 1.2 | 0 parts | 1.0 parts | Foam defects | Not according to the invention |
| 1.3 | 1.0 parts | 0.5 parts | 23 | Inventive |
| 1.4 | 1.0 parts | 1.0 parts | 24 | Inventive |
| 1.5 | 1.5 parts | 0 parts | 8 | Not according to the invention |

Comparative Example 1.1, featuring 1.0 part by weight of the hydrophilic polyether siloxane A in the polyol component is the standard and allows 10 spray passes before there is increasing clogging of the discharge nozzle. A 1.0 part by weight quantity of the hydrophobic polyether siloxane B in the polyol component (Example 1.2) fails to provide sufficient stabilization to the spray foam, leading to foam defects. A combination of 1.0 part by weight of A and 0.5 (Example 1.3) or, respectively, 1.0 (Example 1.4) part by weight of B in the polyol component, however, leads to a distinct increase in the number of spray passes possible before evidence for the onset of clogging. Yet a sole increase in the amount of A to 1.5 parts by weight (Example 1.5) does not give the desired result.

A second experimental series of Example 1 has the hydrophobic polyether siloxane B of the polyether siloxane combination in the isocyanate component and the hydrophilic polyether siloxane A in the polyol component. The results are summarized in Table 3.

The hydrophilic polyether siloxane has isocyanate-reactive groups and so is unsuitable for inclusion in the isocyanate component.

TABLE 3

| Ex. | Weight fraction of A in polyol component | Weight fraction of B in isocyanate component | Number of spray passes before evidence of congestion | |
|---|---|---|---|---|
| 1.6 | 1.0 parts | 0.5 parts | 29 | Inventive |
| 1.7 | 1.0 parts | 1.0 parts | 31 | Inventive |

The sole use of 1.0 part by weight of A in the polyol component (Example 1.1), as reported, results in 10 spray passes without signs of clogging. The additional inclusion in the isocyanate component of 0.5 (Example 1.6) or 1.0 (Example 1.7) part by weight of B leads to a distinct increase in the number of spray passes possible before any congestion occurs.

Example 2: Reduction in Discharge Nozzle Clogging of Spray Foam Apparatus

The following additives were used:

Polyether siloxane C: hydrophilic, of structure $M_2D_{30}D'_8$
where $R^2=R^1=CH_3$; is 80 mol % $R^3=-(CH_2)_3-O-[CH_2CH_2O]_{12}H$, 20 mol % $R^3=-(CH_2)_3-O-[CH_2CH_2O]_{13}[CH_2CH(CH_3)O]_3H$ Polyether siloxane D: hydrophobic, of structure $M_2D_{32.5}D'_5D''_{0.5}$
where $R^2=R^1=CH_3$; is 90 mol % $R^3=-(CH_2)_3-O-[CH_2CH_2O]_8[CH_2CH(CH_3)O]_{16}C(O)CH_3$, is 10 mol % $R^3=-(CH_2)_3-O-[CH_2CH_2O]_{24}[CH_2CH(CH_3)O]_4C(O)CH_3$; $R^9=-(CH_2)_8-$ A first experimental series of Example 2 has both the hydrophobic polyether siloxane D and the hydrophilic polyether siloxane C of the polyether siloxane combination in the polyol component. The results are summarized in Table 4.

TABLE 4

| Ex. | Weight fraction of C in polyol component | Weight fraction of D in polyol component | Number of spray passes before evidence of congestion | |
|---|---|---|---|---|
| 2.1 | 1.0 parts | 0 parts | 12 | Not according to the present invention (standard) |
| 2.2 | 0 parts | 1.0 parts | Foam defects | Not according to the invention |
| 2.3 | 1.0 parts | 0.5 parts | 19 | Inventive |
| 2.4 | 1.0 parts | 1.0 parts | 20 | Inventive |
| 2.5 | 1.5 parts | 0 parts | 11 | Not according to the invention |

Example 2.1 with 1.0 part by weight of the hydrophilic polyether siloxane C in the polyol component is the comparative example and gives 12 spray passes before there is increasing clogging of the discharge nozzle. A 1.0 part by weight quantity of the hydrophobic polyether siloxane D in the polyol component (Example 2.2) fails to provide sufficient stabilization to the spray foam, leading to foam defects. A combination of 1.0 part by weight of C and 0.5 (Example 2.3) or, respectively, 1.0 (Example 2.4) part by weight of D in the polyol component, however, leads to a distinct increase in the number of spray passes possible before evidence for the onset of clogging. Yet a sole increase in the amount of C to 1.5 parts by weight (Example 2.5) does not give the desired result.

A second experimental series of Example 2 has the hydrophobic polyether siloxane D of the polyether siloxane combination in the isocyanate component and the hydrophilic polyether siloxane C in the polyol component. The results are summarized in Table 5. The hydrophilic polyether siloxane has isocyanate-reactive groups and so is unsuitable for inclusion in the isocyanate component.

TABLE 5

| Ex. | Weight fraction of C in polyol component | Weight fraction of D in isocyanate component | Number of spray passes before evidence of congestion | |
|---|---|---|---|---|
| 2.6 | 1.0 parts | 0.5 parts | 26 | Inventive |
| 2.7 | 1.0 parts | 1.0 parts | 24 | Inventive |

The sole use of 1.0 part by weight of C in the polyol component (Example 2.1), as reported, results in 12 spray passes without signs of clogging. The additional inclusion in the isocyanate component of 0.5 (Example 2.6) or 1.0 (Example 2.7) part by weight of D leads to a distinct increase in the number of spray passes possible before any clogging occurs.

Example 3: Improvement in Flow of Foaming Mixture

The following polyether siloxanes were used:
Polyether siloxane A: (Polyether siloxane variety 1) of the structure $M_2D_{11}D'_3$ where $R^2=R^1=CH_3$; $R^3=-(CH_2)_3-O-[CH_2CH_2O]_{12}H$ Polyether siloxane B: (Polyether siloxane variety 2) of the structure $M_2D_{70}D'_{7.5}D''_{0.5}$ where $R^2=R^1=CH_3$; $R^3=-(CH_2)_3-O-[CH_2CH_2O]_{19}[CH_2CH(CH_3)O]_{10}Me$; $R^9=-CH_2-CH_2-[Si(CH_3)_2O]_1-Si(CH_3)_2CH_2-CH_2-$ A first experimental series of Example 3 has polyether siloxane B and polyether siloxane A of the polyether siloxane combination in the polyol component. The results are summarized in Table 6.

TABLE 6

| Ex. | Weight fraction of A in polyol component | Weight fraction of B in polyol component | Average foam flow | Flow improvement compared with standard (Exp. 3.1) | |
|---|---|---|---|---|---|
| 3.1 | 1.0 parts | 0 parts | 6.0 cm | — | Not according to the present invention (Standard) |
| 3.2 | 0 parts | 1.0 parts | Foam defects | — | Not according to the invention |
| 3.3 | 1.0 parts | 0.5 parts | 13.5 cm | 125% | Inventive |
| 3.4 | 1.0 parts | 1.0 parts | 15.1 cm | 152% | Inventive |
| 3.5 | 1.5 parts | 0 parts | 6.2 cm | 3% | Not according to the invention |

Example 3.1, featuring 1.0 part by weight of polyether siloxane A in the polyol component, is the comparative example and gives an average fill length for the tubes of 6.0 cm. A 1.0 part by weight quantity of the polyether siloxane B in the polyol component (Example 3.2) fails to provide sufficient stabilization to the spray foam, leading to foam defects. A combination of 1.0 part by weight of A and 0.5 (Example 3.3) or, respectively, 1.0 (Example 3.4) part by weight of B in the polyol component, gives a distinct enhancement of flow. Yet a sole increase in the amount of A to 1.5 parts by weight (Example 3.5) does not give the desired result.

A second experimental series of Example 3 has the polyether siloxane B of the polyether siloxane combination in the isocyanate component and the polyether siloxane A in the polyol component. The results are summarized in Table 7. The polyether siloxane A has isocyanate-reactive groups and so is unsuitable for inclusion in the isocyanate component.

TABLE 7

| Ex. | Weight fraction of A in polyol component | Weight fraction of B in polyol component | Average foam flow | Flow improvement compared with standard (Exp. 3.1) | |
|---|---|---|---|---|---|
| 3.6 | 1.0 parts | 0.5 parts | 8.3 | 38% | Inventive |
| 3.7 | 1.0 parts | 1.0 parts | 8.5 | 42% | Inventive |

The sole use of 1.0 part weight of A in the polyol component (Example 3.1) gives, as already stated, an average fill length for the tubes of 6.0 cm. The inclusion of an additional 0.5 (Example 3.6) or 1.0 (Example 3.7) part by weight of B in the isocyanate component results in a distinct enhancement of flow.

Example 4: Improvement in Flow of Foaming Mixture

The following polyether siloxanes were used:

Polyether siloxane C: Polyether siloxane variety 1 of the structure $M_2D_{30}D'_8$ where $R^2=R^1=CH_3$; is 80 mol % $R^3=-(CH_2)_3-O-[CH_2CH_2O]_{12}H$, is 20 mol % $R^3=-(CH_2)_3-O-[CH_2CH_2O]_{13}[CH_2CH(CH_3)O]_3H$ Polyether siloxane D: Polyether siloxane variety 2 of the structure $M_2D_{32.5}D'_5D''_{0.5}$ where $R^2=R^1=CH_3$; is 90 mol % $R^3=-(CH_2)_3-O-[CH_2CH_2O]_8[CH_2CH(CH_3)O]_{16}C(O)CH_3$, is 10 mol % $R^3=-(CH_2)_3-O-[CH_2CH_2O]_{24}[CH_2CH(CH_3)O]_4C(O)CH_3$; $R^9=-(CH_2)_8-$ A first experimental series of Example 4 has polyether siloxane D and polyether siloxane C of the polyether siloxane combination in the polyol component. The results are summarized in Table 8.

TABLE 8

| Ex. | Weight fraction of C in polyol component | Weight fraction of D in polyol component | Average foam flow | Flow improvement compared with standard (Exp. 4.1) | |
|---|---|---|---|---|---|
| 4.1 | 1.0 parts | 0 parts | 5.4 cm | — | Not according to the present invention (standard) |
| 4.2 | 0 parts | 1.0 parts | Foam defects | — | Not according to the invention |
| 4.3 | 1.0 parts | 0.5 parts | 11.1 | 106% | Inventive |
| 4.4 | 1.0 parts | 1.0 parts | 12.0 | 122% | Inventive |
| 4.5 | 1.5 parts | 0 parts | 5.9 | 9% | Not according to the invention |

Example 4.1, featuring 1.0 part by weight of polyether siloxane C in the polyol component, is the comparative example and gives an average fill length for the tubes of 5.4 cm. A 1.0 part by weight quantity of the polyether siloxane D in the polyol component (Example 4.2) fails to provide sufficient stabilization to the spray foam, leading to foam defects. A combination of 1.0 part by weight of C and 0.5 (Example 4.3) or, respectively, 1.0 (Example 4.4) part by weight of D in the polyol component, gives a distinct enhancement of flow. Yet a sole increase in the amount of C to 1.5 parts by weight (Example 4.5) does not give the desired result.

A second experimental series of Example 4 has the polyether siloxane D of the polyether siloxane combination in the isocyanate component and the polyether siloxane C in the polyol component. The results are summarized in Table 9. The polyether siloxane C has isocyanate-reactive groups and so is unsuitable for inclusion in the isocyanate component.

TABLE 9

| Ex. | Weight fraction of C in polyol component | Weight fraction of D in isocyanate component | Average foam flow | Flow improvement compared with standard (Exp. 4.1) | |
|---|---|---|---|---|---|
| 4.1 | 1.0 parts | 0 parts | 5.4 cm | — | Not according to the present invention (standard) |
| 4.6 | 1.0 parts | 0.5 parts | 7.5 | 39% | Inventive |
| 4.7 | 1.0 parts | 1.0 parts | 7.8 | 44% | Inventive |

The sole use of 1.0 part by weight of C in the polyol component (Example 4.1) gives, as already stated, an average fill length for the tubes of 5.4 cm. The inclusion of an additional 0.5 (Example 4.6) or 1.0 (Example 4.7) part by weight of D in the isocyanate component results in a distinct enhancement of flow.

The invention claimed is:

1. A composition suitable for production of rigid polyurethane or polyisocyanurate foams, comprising at least one isocyanate component, at least one isocyanate-reactive component, at least one foam stabilizer, at least one urethane and/or isocyanurate catalyst, optionally water and/or blowing agent, and optionally at least one flame retardant and/or further additives, wherein the composition comprises at least two different varieties of polyether siloxanes as foam stabilizers, wherein one polyether siloxane variety, hereinafter polyether siloxane variety 1, conforms to formula (I)

(I)

$$M_aD_bD'_cD''_dT_eQ_f$$

$R^1$=independently alike or different hydrocarbon moieties of 1 to 16 carbon atoms, $R^2$=independently $R^1$, $R^3$ or $R^4$, wherein $R^3$ is a polyether moieties of general formula (II), (II)

$-R^5O[CH_2CH_2O]_g[CH_2CH(CH_3)O]_h[CHR^6CHR^7O]_iR^8$ wherein $R^5$ is a divalent hydrocarbon moieties of 1 to 16 carbon atoms, which may be interrupted by oxygen atoms, preferably a moiety of general formula (IV)

(IV)

$-(CH_2)_j-$ where j=1 to 8, $R^6$ and $R^7$ are hydrocarbon moieties of 1 to 16 carbon atoms, which may be interrupted by oxygen atoms, or H, $R^8$ are hydrocarbon moieties of 1 to 16 carbon atoms, which may be interrupted by urethane functions, —C(O)NH—, carbonyl functions or —C(O)O—, or H, $R^4$ independently alike or different moieties of the general formula (IIIa) or (IIIb)

$$\begin{array}{c} R^1 \\ | \\ -R^9-Si-O_{1/2} \\ | \\ O_{1/2} \end{array} \quad (IIIa)$$

$$\begin{array}{c} R^1 \\ | \\ -R^9-Si-R^1 \\ | \\ O_{1/2} \end{array} \quad (IIIb)$$

$R^9$=a divalent organic moiety, which may optionally be interrupted by one or more oxygen functions or functions of the formula —[SiR$^1_2$—O]$_k$—SiR$^1_2$— where k=1 to 10, and optionally possess OH functions, a is from 2 to 32,
b is from 2 to 247,
c is from 0.5 to 35,
d is from 0 to 6,
e is from 0 to 15,
f is from 0 to 15,
wherein N=a+b+c+d+e+f is from 5 to 250,
g is from 4 to 25,
h is from 0 to 10,
i is 0,
wherein the polyether siloxanes of polyether siloxane variety 1 are subject to the condition that g+h+i is >3 and that there is at least one $R^3$ moiety whose molar weight comprises at least 90% by mass of —[CH$_2$CH$_2$O]— units, and one polyether siloxane variety, hereinafter polyether siloxane variety 2, conforms to formula (I) as defined for polyether siloxane variety 1, wherein in the case of polyether siloxane variety 2 a=2 to 32,
b=2 to 297,
c=0.3 to 30,
d=0 to 6,
e=0 to 15,
f=0 to 15,
wherein N=a+b+c+d+e+f is from 5 to 300,
g is from 5 to 30,
h is from 3 to 20, and
i is 0, and polyether siloxanes of polyether siloxane variety 2 are subject to the condition that g+h+i is >3 and there is at least one $R^3$ moiety whose molar weight comprises at most 50% by mass, by mass by mass of —[CH$_2$CH$_2$O]— units where as polyether siloxanes of the polyether siloxane variety 1 are present, in which $R^3$ contains more than 70 mol % of the radicals $R^8$H in the residues present, and where as polyether siloxanes of polyether siloxane variety 2 such are present at which in the residues $R^3$ present are less than 30 mol % of the residues $R^8$H, and wherein the mass ratio of polyether siloxanes of the polyether siloxane variety 1 to polyether siloxanes of polyether siloxane variety 2 in the composition of 0.1 to 1 to 1 to 0.1.

2. The composition according to claim 1, wherein the polyether siloxanes present as polyether siloxanes of polyether siloxane variety 1 are those where above 100 mol % of the $R^8$ moieties in the $R^3$ moieties present are H.

3. The composition according to claim 1, wherein the polyether siloxanes present as polyether siloxanes of polyether siloxane variety 2 are those where less than 10 mol %, of the $R^8$ moieties in the $R^3$ moieties present are H.

4. The composition according to claim 1, wherein the mass fraction of polyether siloxanes of polyether siloxane varieties 1 and 2 in the composition, based on 100 parts by mass of polyol component (pphp), is in the range from 0.05 to 10 pphp.

5. The composition according to claim 1, wherein the mass ratio of polyether siloxanes of polyether siloxane variety 1 to polyether siloxanes of polyether siloxane variety 2 in the composition is in the range from 0.2:1 to 1:0.2.

6. The composition according to claim 1, wherein the composition contains exclusively polyether siloxanes that are encompassed by the definitions of polyether siloxane variety 1 or polyether siloxane variety 2.

7. The composition according to claim 1, obtainable by combining two or more separate components, where one of the components is the isocyanate-reactive component and one other component is the isocyanate component, in which case the isocyanate-reactive component is used as a mixture comprising all polyether siloxanes of polyether siloxane variety 1.

8. The composition according to claim 7, wherein the isocyanate-reactive component is used as a mixture comprising all polyether siloxanes of polyether siloxane variety 1 or polyether siloxane variety 2.

9. The composition according to claim 7, wherein the isocyanate component is used as a mixture comprising all polyether siloxanes of polyether siloxane variety 2.

10. The composition according to claim 1, wherein $R^1$ is selected from the group consisting methyl, ethyl, propyl and phenyl.

11. The composition according to claim 1, wherein $R^1$ is methyl.

12. The composition according to claim 1, wherein the mass fraction of polyether siloxanes of polyether siloxane varieties 1 and 2 in the composition, based on 100 parts by mass of polyol component (pphp), is in the range from 0.1 to 3 pphp.

13. The composition according to claim 12, wherein j=3, $R^6$ and $R^7$ is selected from the group consisting of methyl, ethyl, phenyl or H, and $R^8$ is selected from the group consisting of methyl, —C(O)Me or H.

14. The composition according to claim 1, wherein
a=2 to 15,
b=3 to 150,
c=1 to 22,
d=0 to 4,
e=0 to 10,
f=0 to 10,
wherein N=a+b+c+d+e+f=5 to 160.

15. The composition according to claim 1, wherein
a=2,
b=4 to 80,
c=1.5 to 12,
d=0, e=0,
f=0,
wherein N=a+b+c+d+e+f=8 to 80.

16. The composition according to claim 1, wherein polyether siloxane variety 2, conforms to formula (I) as defined for polyether siloxane variety 1, with the proviso that in the case of polyether siloxane variety 2
a=2 to 15,
b=3 to 190,
c=0.9 to 20,
d=0 to 4,
e=0 to 10,
f=0 to 10,
wherein N=a+b+c+d+e+f=8 to 200
and there is at least one $R^3$ moiety whose molar weight comprises at most 60% by mass by mass of —[$CH_2CH_2O$]— units.

* * * * *